United States Patent
Reedy et al.

(10) Patent No.: US 10,926,627 B2
(45) Date of Patent: Feb. 23, 2021

(54) FUEL STORAGE SYSTEM FOR A VEHICLE AND VEHICLE INCLUDING SAME

(71) Applicant: Honda Motor Co., Ltd., Tokyo (JP)

(72) Inventors: Christopher L. Reedy, Marysville, OH (US); Caleb A. Ziebold, Bellefontaine, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/508,057

(22) Filed: Jul. 10, 2019

(65) Prior Publication Data
US 2021/0008977 A1    Jan. 14, 2021

(51) Int. Cl.
| | |
|---|---|
| *B60K 15/067* | (2006.01) |
| *B60G 21/055* | (2006.01) |
| *F02D 41/00* | (2006.01) |
| *B62D 21/18* | (2006.01) |

(52) U.S. Cl.
CPC .......... *B60K 15/067* (2013.01); *B60G 21/055* (2013.01); *F02D 41/0032* (2013.01); *B62D 21/18* (2013.01)

(58) Field of Classification Search
CPC . B60K 15/067; F02D 41/0032; B60G 21/055; B62D 21/18
See application file for complete search history.

(56) References Cited

U.S. PATENT DOCUMENTS

| | | | |
|---|---|---|---|
| 5,560,651 A * | 10/1996 | Kami | B60G 3/20 |
| | | | 180/296 |
| 6,308,987 B1 | 10/2001 | Mitake | |
| 7,237,644 B2 | 7/2007 | Matsumoto et al. | |
| 7,438,058 B2 | 10/2008 | Ito et al. | |
| 8,007,403 B2 | 8/2011 | Ishida et al. | |
| 9,133,797 B2 | 9/2015 | Shomura et al. | |
| 9,358,876 B2 * | 6/2016 | Hanashima | F01N 13/1822 |
| 9,650,078 B2 | 5/2017 | Kinsman et al. | |
| 10,399,435 B2 * | 9/2019 | Bastien | B60K 15/03504 |
| 2005/0224265 A1 * | 10/2005 | Mizuno | B60K 1/04 |
| | | | 429/413 |
| 2010/0206272 A1 * | 8/2010 | Ishida | F02M 25/089 |
| | | | 123/520 |
| 2011/0011654 A1 * | 1/2011 | Kubota | B60K 15/063 |
| | | | 180/65.21 |
| 2014/0202783 A1 * | 7/2014 | Shomura | F02M 25/0854 |
| | | | 180/69.4 |
| 2017/0159617 A1 * | 6/2017 | Hamamura | F02M 35/048 |
| 2018/0017027 A1 * | 1/2018 | Tomomatsu | F16L 3/13 |
| 2018/0178858 A1 | 6/2018 | Hollman et al. | |
| 2018/0354356 A1 * | 12/2018 | Reedy | B60K 15/063 |
| 2019/0061518 A1 * | 2/2019 | Hayashi | F02M 37/0023 |
| 2019/0211915 A1 * | 7/2019 | Davis | B62D 21/183 |

FOREIGN PATENT DOCUMENTS

JP        2003237390 A        8/2003

\* cited by examiner

*Primary Examiner* — Erez Gurari
(74) *Attorney, Agent, or Firm* — Kenealy Vaidya LLP

(57) ABSTRACT

A vehicle can include a longitudinal direction, a traverse direction and a vertical direction that are orthogonal to each other, a pair of front seats, a pair of rear seats, a fuel tank and a canister. The pair of rear seats can be mounted behind the first pair of seats in the longitudinal direction. The fuel tank can be mounted under a first of the rear seats. The canister can be mounted under a second of the rear seats.

20 Claims, 5 Drawing Sheets

FUEL STORAGE SYSTEM FOR A VEHICLE AND VEHICLE INCLUDING SAME

BACKGROUND

The disclosed subject matter relates to a fuel storage system for a vehicle. More particularly, the disclosed subject matter relates to methods and apparatus for mounting a canister and a fuel tank to the vehicle.

A vehicle that includes an internal combustion engine can include a fuel storage system that includes a fuel tank and a canister in fluid communication with the fuel tank. The fuel stored in the fuel tank can be in a liquid state and a gaseous state simultaneously. In order to limit or reduce hydrocarbons emitted by the vehicle, the canister can be a component of an evaporative emissions system that can capture and store the fuel vapor until an appropriate time when the stored vapor can be burned in the combustion process of the engine. The canister can include a material such as charcoal or other form of carbon that can absorb the fuel vapor. The evaporative emissions system can include a purge valve and a processor-based controller configured to selectively open the purge valve to permit fuel vapor in the canister to be drawn into the combustion chamber(s) of the engine.

SUMMARY

Some embodiment are directed to a vehicle including a longitudinal direction, a traverse direction and a vertical direction that are orthogonal to each other, a pair of front seats, a pair of rear seats, a fuel tank and a canister. The pair of rear seats can be mounted behind the first pair of seats in the longitudinal direction. The fuel tank can be mounted under a first of the rear seats. The canister can be mounted under a second of the rear seats.

Some embodiments are directed to a fuel storage system for a vehicle including a front row of seats and a rear row of seats located behind the front row of seats. The fuel storage system can include a tube, a carbon canister, a fuel tank and a vapor conduit. The tube can be configured to support the rear row of seats on the tube. The carbon canister can be suspended from the tube and located below a first seat of the rear row of seats. The fuel tank can be adjacent to each of the tube and the carbon canister and located below a second seat of the rear row of seats. The vapor conduit can extend from and in fluid communication with each of the fuel tank and the carbon canister.

Some embodiments are directed to a fuel storage system for a vehicle that can include a frame assembly, a seat support mounted to frame assembly, a pair of front seats mounted to the frame assembly in front of the seat support, and a pair of rear seats mounted to the seat support and located behind the pair of front seats. The fuel storage system can include a fuel tank and a canister. The fuel tank can be mounted to the frame assembly underneath a first one of the rear seats. The canister can be mounted to the seat support at a location underneath a second one of the rear seats and in fluid communication with the fuel tank.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

A vehicle fuel storage system can advantageously capture and store fuel vapor in a canister when the length of conduit connecting the fuel tank and the canister is as short as possible so that the volume of fuel vapor contained in the conduit is as small as possible. That is, a shorter conduit has less surface area than a longer conduit. Thus, the potential for unintentional leakage of fuel vapor through the conduit is less for a shorter conduit than it is for a longer conduit. Mounting the canister directly adjacent to the fuel tank can provide the shortest possible length of conduit connecting the canister to the fuel tank. However, other component(s), structure(s) and/or system(s) of the vehicle can make it difficult to package the canister directly adjacent to the fuel tank.

In accordance with the disclosed subject matter, a fuel storage system for a vehicle can include a canister mounted under a first rear seat and a fuel tank mounted under a second rear seat of a vehicle having two rows of seats. As a result, the canister and the fuel tank can be mounted close together in respective spaces that avoid an adverse impact on the packaging of other component(s), structure(s) and/or system(s) of the vehicle. This spatial orientation of the canister and the fuel tank can also provide a relatively short length for the conduit connecting the canister to the fuel tank.

Further, a center of gravity of the vehicle can be close to the rear seats in a vehicle that has two rows of seats. Mounting the canister under one of the rear seats can locate the canister relatively close to the vehicle's center of gravity. Thus, vibrations and other forces imparted on the canister can be reduced or minimized by mounting the canister under one of the rear seats.

Figure 1:
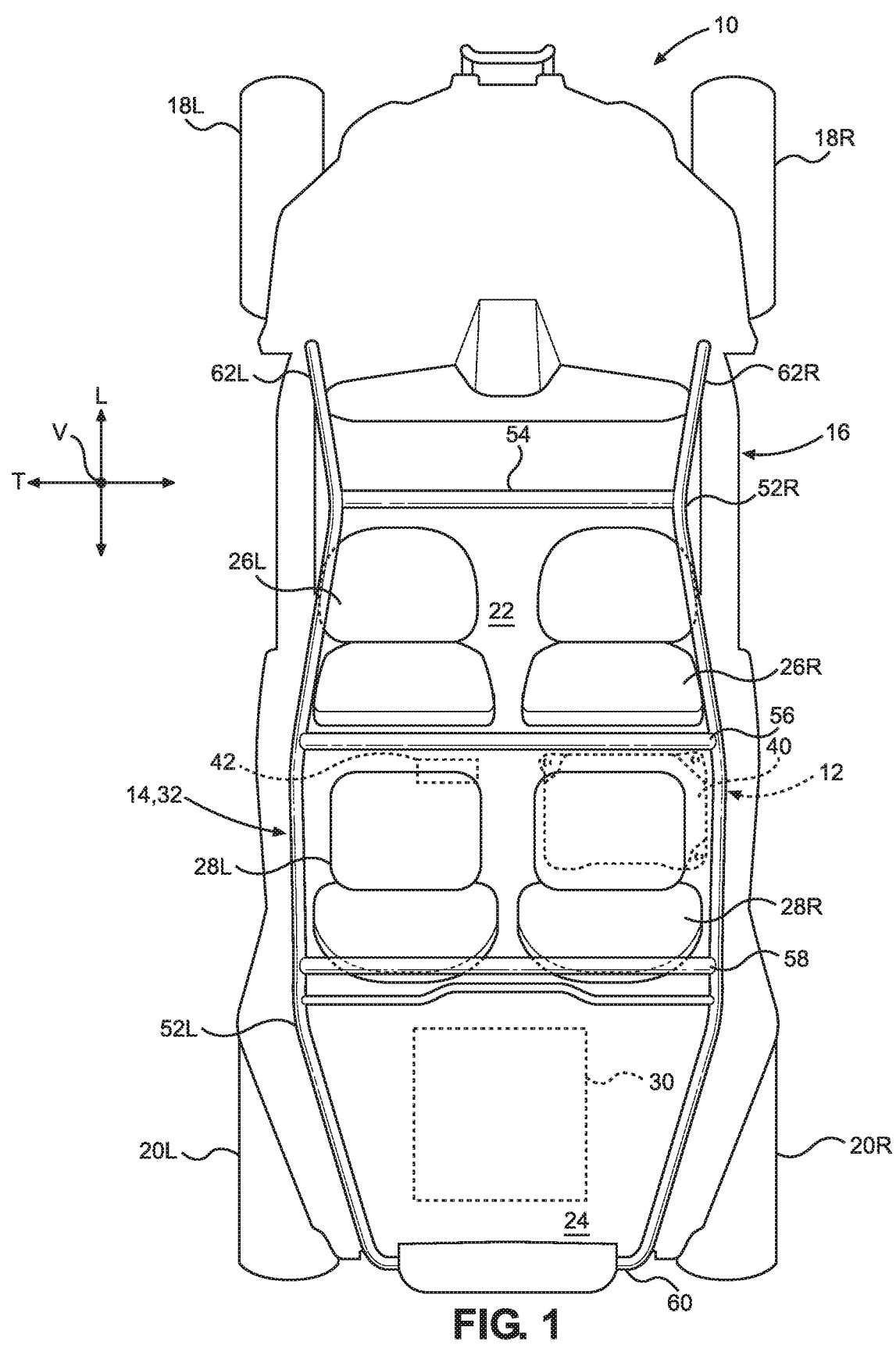
FIG. 1 is a top view of a vehicle including a fuel storage system in accordance with the disclosed subject matter.

FIG. 1 illustrates an embodiment of a vehicle 10 and a fuel storage system 12 for the vehicle 10 made in accordance with the principles of the disclosed subject matter. The fuel storage system 12 can be covered by one or more interior panels that are not individually depicted in FIG. 1 for simplicity and clarity of the drawing. The vehicle 10 can have a longitudinal direction L, a traverse direction T and a vertical direction V that are orthogonal to each other. The vehicle 10 can include a frame assembly 14, a body 16, a pair of front wheels 18L, 18R, a pair of rear wheels 20L, 20R, a passenger space 22, a cargo bed 24, a row of front seats 26L, 26R, a row of rear seats 28L, 28R, and a power source 30.

Figure 2:
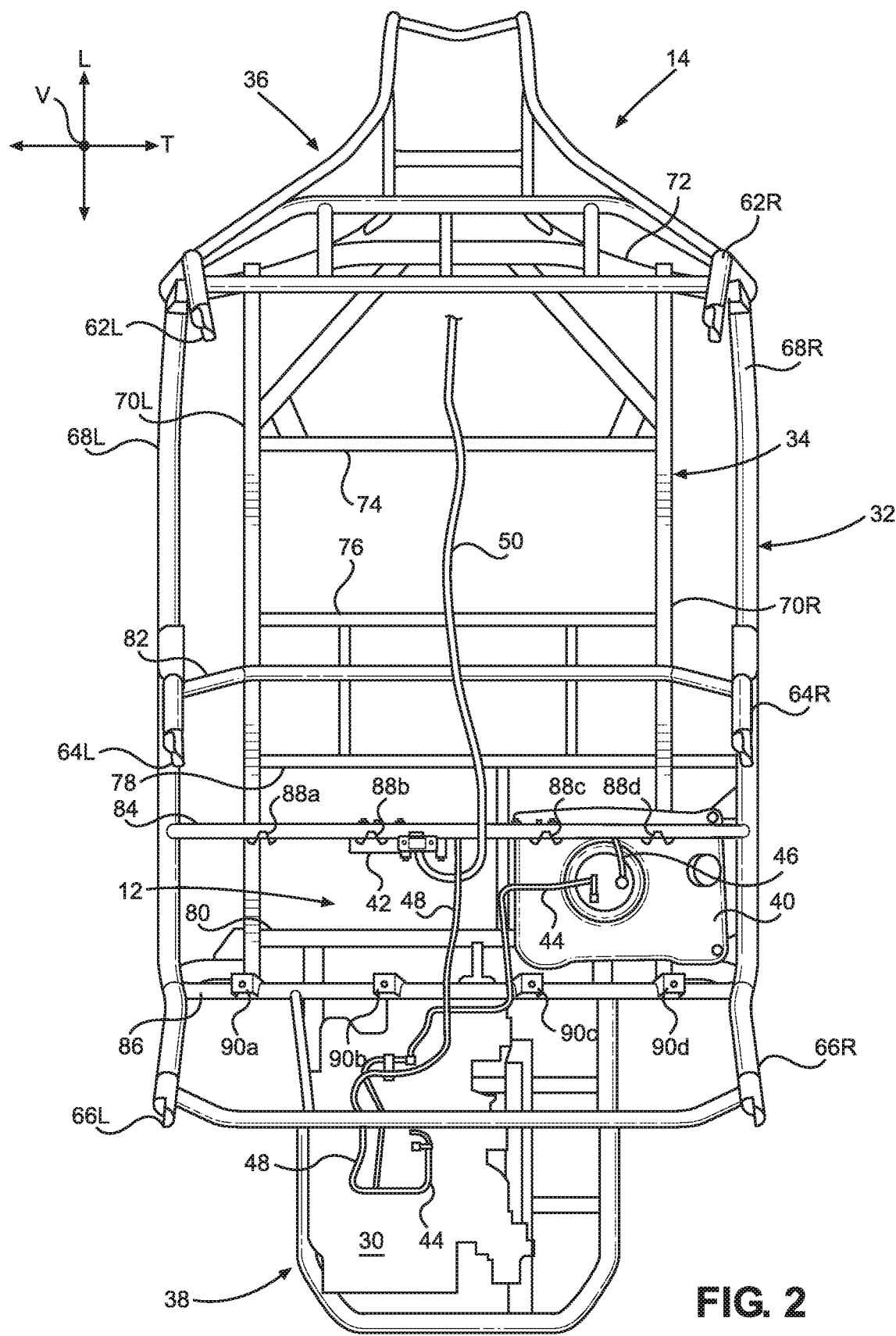
FIG. 2 is a top view of a frame assembly and a fuel storage system of the vehicle of FIG. 1.
Figure 3:
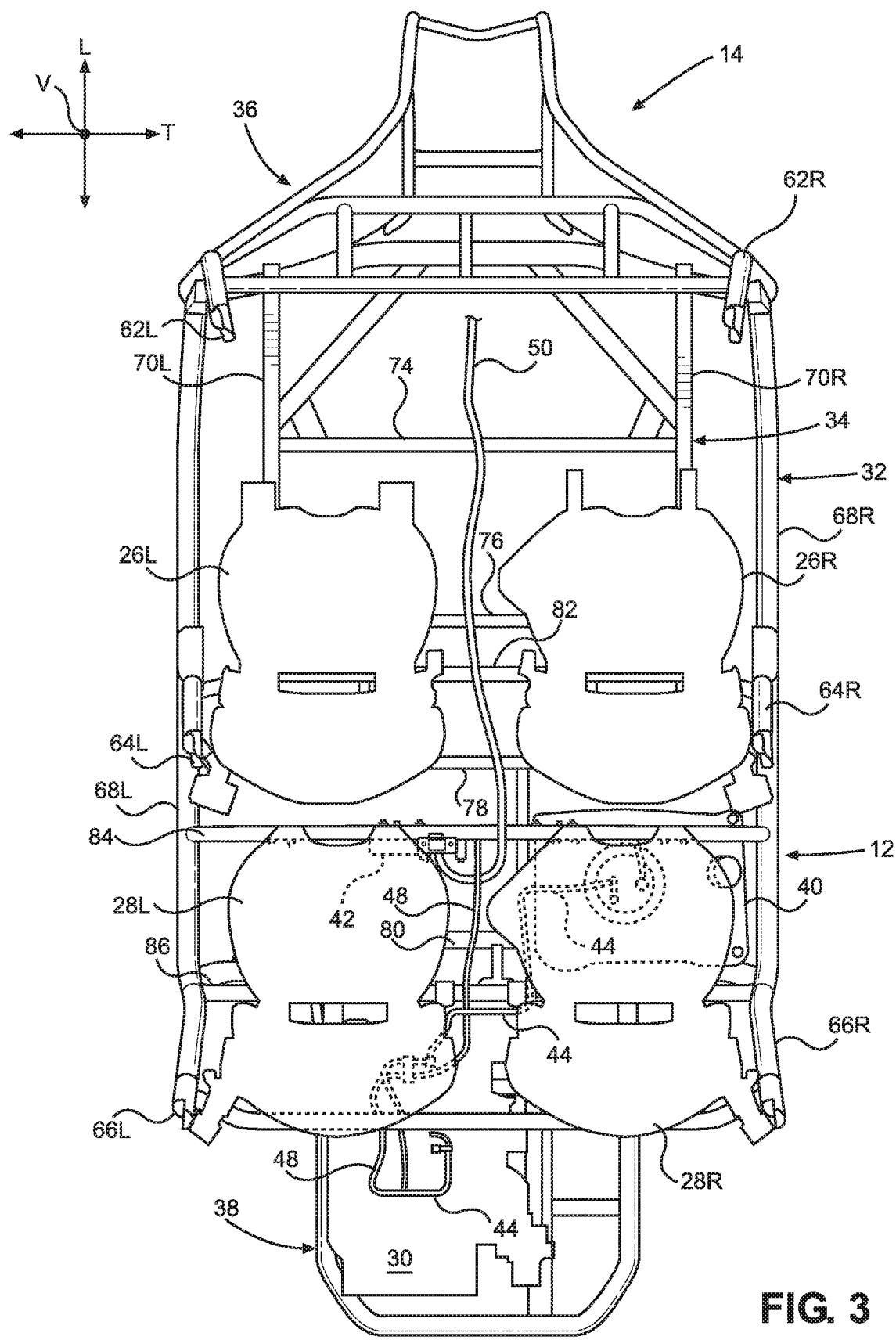
FIG. 3 is a top view of a frame assembly and a fuel storage system of the vehicle of FIG. 1 with the seats mounted to the frame assembly.

Referring to FIGS. 1-3 collectively, the frame assembly 14 can include a rollover protection structure 32, a main frame assembly 34, a front frame assembly 36 and a rear frame assembly 38. The body 16 obstructs the frame assemblies 34, 36, 38 from view in FIG. 1. The body 16, an upper portion of rollover protection structure 32, and the components and systems in the interior of the vehicle 10 shown in FIG. 1 are omitted from FIGS. 2 and 3 to more clearly show the frame assembly 14. However, FIG. 3 schematically illustrates a silhouette of the seats 26L, 26R, 28L, 28R to more clearly show a spatial relationship between the seats 26L, 26R, 28L, 28R and the fuel storage system 12.

The body 16 can cover one or more portions of the frame assembly 14. The body 16 can expose the upper portion of the rollover protection structure 30. The rollover protection structure 30 can extend around and above the passenger space 22. The seats 26L, 26R, 28L, 28R can be located within a volume surrounded by the rollover protection structure 32 and the main frame assembly 34.

The seats 26L, 26R, 28L, 28R can be mounted to the vehicle 10 in the passenger space 22 such that the rear seats 28L, 28R are behind the front seats 26L, 26R in the longitudinal direction L of the vehicle 10.

FIG. 1 schematically illustrates the power source 30 in phantom. FIGS. 2 and 3 schematically illustrate a silhouette of the power source 30. The power source 30 can be an internal combustion engine or a hybrid of an internal combustion engine and an electric motor. The internal combustion engine can have the engine output axis oriented in the longitudinal direction L or in the traverse direction T of the vehicle 10. The engine can be mounted forward of the front axles, rearward of the rear axles, or intermediate the front and rear axles. In the exemplary embodiment of FIG. 1, the power source 30 is configured as a longitudinally oriented intermediate-mounted internal combustion engine. The power source 30 can include a multi-speed ratio transmission that is driven by the internal combustion engine and is configured to multiply the torque output by the internal combustion engine.

The power source 30 can be mounted to the rear frame 38 and located behind and below the rear seats 28L, 28R. The power source 30 can also be located between the rear seats 28L, 28R and the rear wheels 20L, 20R in the longitudinal direction L of the vehicle 10. Thus, the fuel storage system 12 and the power source 30 can be located adjacent the rear seats 28L, 28R.

Figure 4:
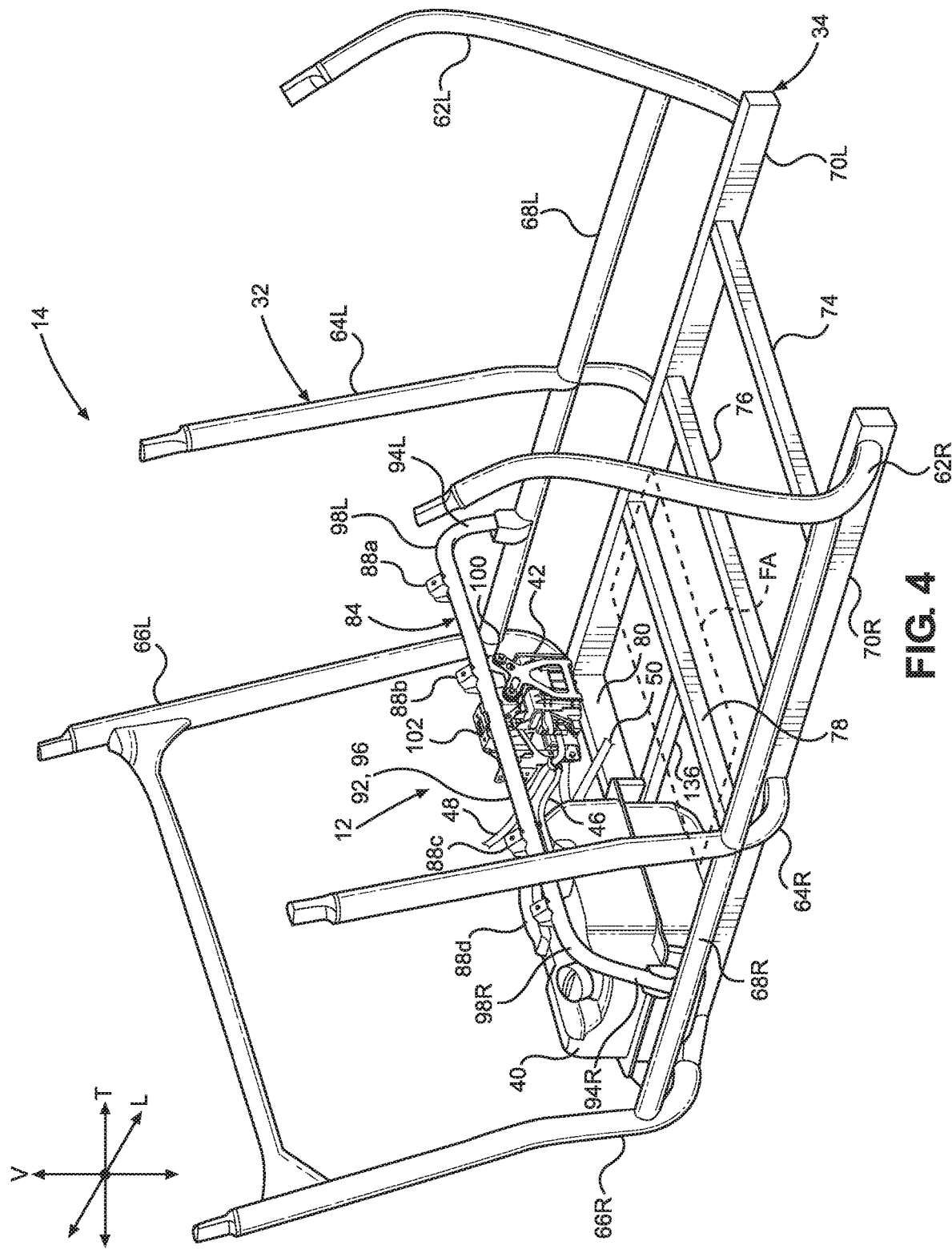
FIG. 4 is a perspective view of a portion of the frame assembly and the fuel storage system of the vehicle of FIG. 1.

Referring to FIGS. 2-4, the fuel storage system 12 can include a fuel tank 40, a canister 42, a fuel supply storage line 44, a vapor storage line 46, a vapor supply line 48 and a wire harness 50. The fuel tank 40 can be mounted to the frame assembly 14 at a location that is below the right rear seat 28R. The canister 42 can be mounted to the frame assembly 14 at a location that is below the left rear seat 28L. The vehicle 10 can be devoid of other component(s), structure(s) and system(s) of the vehicle 10 in the spaces between the rear seats 28L, 28R and the main frame assembly 34. The canister 42 and the fuel tank 40 can be mounted close together in these spaces. This packaging of the canister 42 and the fuel tank 40 can avoid an adverse impact on the packaging of other component(s), structure(s) and/or system(s) of the vehicle 10. This spatial orientation of the canister 42 and the fuel tank 40 can also provide a relatively short length for the vapor supply line 46 that connects the canister 42 to the fuel tank 42. Further, the fuel tank 40 and the canister 42 can be relatively close to the internal combustion engine 30 of the power source 30 such that the fuel supply line 44 and the vapor supply line 48 can have a relatively small length. Further still, the center of gravity of the vehicle 10 can be close to the rear seats 28L, 28R such that vibrations and other forces imparted on the canister 42 (and fuel tank 40) can be reduced or minimized by mounting the canister 42 under one of the left rear seat 28L.

The canister 42 can be a carbon canister that includes charcoal or other absorbent material therein. The canister 42 serves as part of the vehicle's emissions control system. The canister's 42 job is to absorb fuel vapor that would otherwise vent out to the atmosphere. Vapors trapped by the charcoal are released back into the engine through a purge valve, and then burned in the internal combustion engine.

The fuel supply line 44 can be connected to and in fluid communication with the fuel tank 40 and the internal combustion engine of the power source 30. The vapor storage line 46 can be connected to and in fluid communication with the fuel tank 40 and the canister 42. The vapor supply line 48 can be connected to and in fluid communication with the canister 42 and the internal combustion engine of the power source 30. Each of the lines 44, 46, 48 can be any appropriate conduit that can convey liquid fuel and/or fuel vapor between the fuel tank 40, the canister 42 and the internal combustion engine of the power source 30.

Packaging the fuel tank 40 and the canister 42 underneath the rear seats 28L, 28R can provide further advantages. A common mounting structure can support the canister 42 and the rear seats 28L, 28R. Further, the common mounting structure can support the vapor supply line 46. Thus, the number of parts for mounting the fuel system 12 and the rear seats 28L, 28R can be reduced or simplified.

Referring to FIG. 1, the rollover protection structure 32 can include a left side frame member 52L, a right side frame member 52R, a first cross member 54, a second cross member 56, a third cross member 58 and a fourth cross member 60. Referring to FIGS. 2-4, the rollover protection structure 32 can include a pair of first pillar members 62L, 62R, a pair of second pillar members 64L, 64R, a pair of third pillar members 66L, 66R and a pair of longitudinal members 68L, 68R. The body 16 obstructs the pillar members 62L, 62R, 64L, 64R, 66L, 66R and the longitudinal members 68L, 68R from view in FIG. 1. The frame members 52L, 52R, 54, 56, 58, 60 and the upper portions of the pillar members 62L, 62R, 64L, 64R, 66L, 66R are omitted from view in FIGS. 2-4 for clarify and simplicity of the drawings.

Referring to FIGS. 2-4, the main frame 34 can include a pair longitudinal members 70L, 70R, a first cross member 72, a second cross member 74, a third cross member 76, a fourth cross member 78 and a fifth cross member 80. The first cross member 72, the front frame assembly 36 and the rear frame assembly 38 are omitted from FIG. 4 for clarity and simplicity of the drawing.

Referring to FIG. 4, at least the fourth cross member 78 can support an interior floor adjacent to the rear seats 28L, 28R. FIG. 4 schematically illustrates a floor area FA in which a floor of the passenger space 22 can be located. The canister 42 can be spaced away from the floor area FA in the vertical direction V of the vehicle 10. The canister 42 can be located at an elevation that is below an elevation of the left rear seat 28L and above an elevation of the floor area FA in the vertical direction V of the vehicle 10.

Referring to FIGS. 2 and 3, the frame assembly 14 can include a plurality of seat supports 82, 84, 86 that extend along the transverse direction T of the vehicle 10. The rear portions of the seat bottoms of the front seats 26L, 26R can be mounted to the front seat support. The front ends of the seat bottoms of the rear seats 28L, 28R can be mounted on the first seat support 84. The rear ends of the seat bottoms of the rear seats 28L, 28R can be mounted on the second rear seat support 86.

Referring to FIG. 2, the first rear seat support 84 can include a plurality of seat brackets 88a, 88b, 88c, 88d and the second rear seat support 86 can include a plurality of seat brackets 90a, 90b, 90c, 90d. The left rear seat 28L can be connected to the brackets 88a, 88b, 90a, 90b. The right rear seat 28R can be connected to the brackets 88c, 88d, 90c, 90d. The rear seats 28L, 28R can be connected to the respective group of brackets 88a, 88b, 88c, 88d, 90a, 90b, 90c, 90d in any appropriate manner such as but not limited to threaded fasteners.

Referring to FIG. 4, the first rear seat support 84 can include a cross member 92 that extends from and is connected to each of the longitudinal members 70L, 70R. The cross member 92 can be a hollow tubular member with a circular cross-sectional shape. The cross member 92 can include a pair of end portions 94L, 94R a central portion 96 and a pair of bend portions 98L, 98R. The left end portion 94L can be connected to and extend from the first left longitudinal members 70L. The right end portion 94R can be connected to and extend from the right longitudinal members 70R. The left bend portion 98L can be connected to and extend from the left end portion 94L to the central portion 96. The right bend portion 98R can be connected to and extend from the right end portion 94R to the central portion 96. The end portions 94L, 94R and the bend portions 98L, 98R can extend along the transverse direction T and the vertical direction V of the vehicle 10. The central portion 96 can extend along the transverse direction T of the vehicle 10. The central portion 96 can be spaced away from the floor area FA in the vertical direction V of the vehicle 10 such that the central portion 96 has an elevation that is above an elevation of the floor of the passenger area 22.

The first rear seat support 84 can be made from any appropriate material such as but not limited to metals, metal alloys, fiber reinforced plastic, carbon fiber, or any combination thereof. The end portions 94L, 94R can be connected to the longitudinal members 70L, 70R in any appropriate member such as welds, mechanical fasteners, adhesive, brackets, and any combination thereof.

The seat brackets 88a, 88b, 88c, 88d can be mounted to the central portion 96 of the cross member 92. The seat brackets 88a, 88b, 88c, 88d can be connected to the cross member 92 in any appropriate manner such as but not limited to welds, mechanical fasteners, adhesives and any combination thereof.

Figure 5:
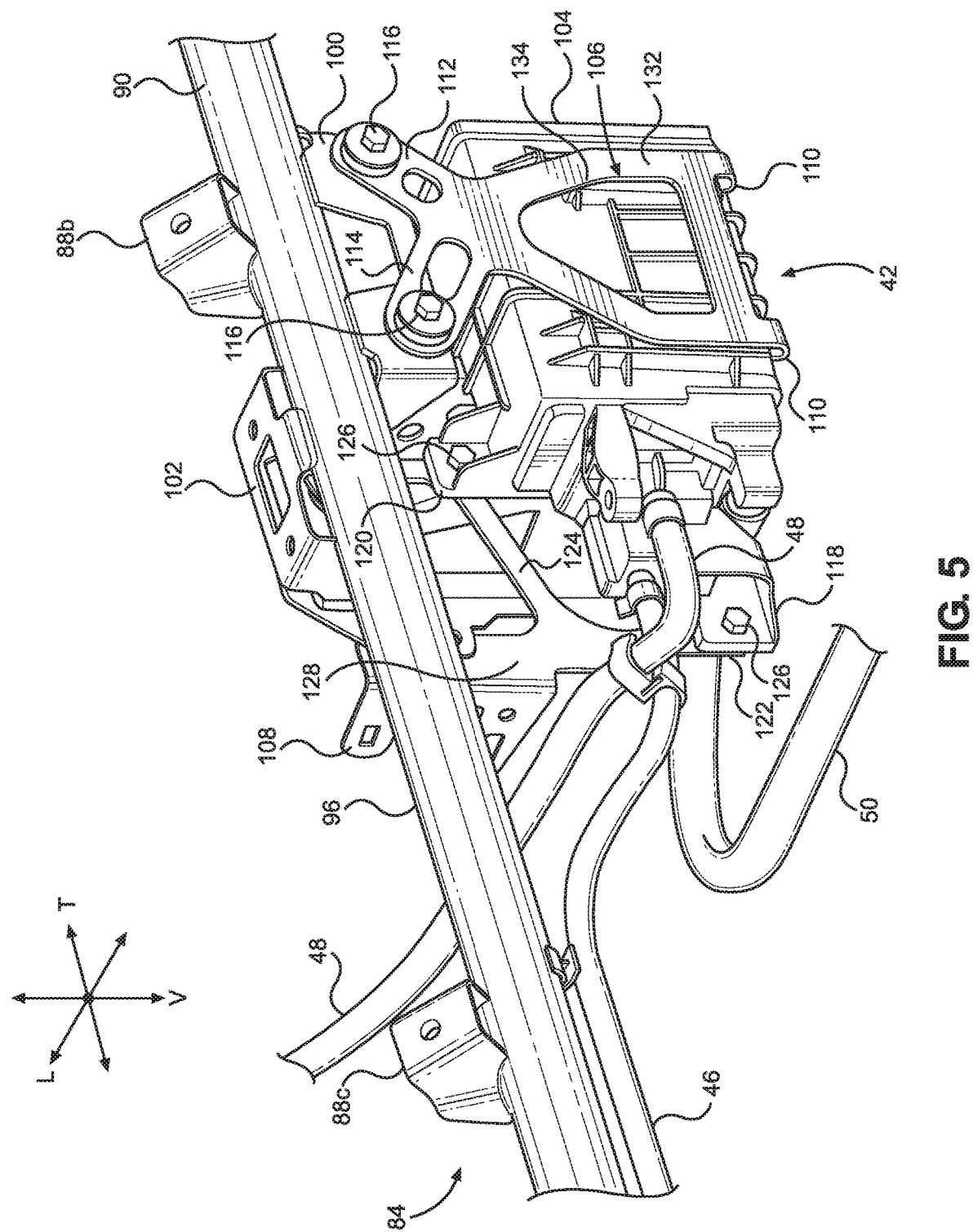
FIG. 5 is a perspective view of an enlarged portion of FIG. 4.

Referring to FIGS. 4 and 5, the canister 42 and the vapor supply line 46 can be mounted to the central portion 96 of the cross member 92. The canister 42 and the vapor supply line 46 can be suspended below the central portion 96 with respect to the vertical direction V of the vehicle 10.

The first rear seat support 84 can include a pair of canister brackets 100, 102 mounted to the cross member 92. The canister brackets 100, 102 can be connected to the cross member 92 in any appropriate manner such as but not limited to welds, mechanical fasteners, adhesives, or any combination thereof. The canister brackets 100, 102 can be located between the right seat brackets 88b for the left rear seat 28L and the left seat bracket 88c for the right rear seat 28R. That is, the canister brackets 100, 102 can be located between the inboard seat brackets 88b, 88c. The canister brackets 100, 102 can be adjacent to the inboard seat bracket 88b for the left rear seat 28L. That is, the canister brackets 100, 102 can be closer to the inboard seat bracket 88b for the left rear seat 28L than they are to the seat bracket 88c for the right rear seat 28R with respect to the transverse direction T of the vehicle 10.

The canister 42 can include a housing 104 and a pair of housing brackets 106, 108 connected to the housing 104. The housing 104 can be made from any appropriate material that can contain fuel vapor in a fluid-tight manner.

The first housing bracket 106 can be connected to the housing 104 in any appropriate manner such as but not limited mechanical fasteners, welds, adhesives, etc. For example, the first housing bracket 106 can include a pair of blades 110 that extend along the vertical direction V of the vehicle 10 that are inserted into passages in the housing 104.

The first housing bracket 106 can be connected to the first canister bracket 100 in any appropriate manner such as but not limited mechanical fasteners, welds, adhesives, etc. The first housing bracket 106 can include a pair of arms 112, 114 that are connected to the first canister bracket 100 of the first rear seat support 84. A threaded fastener 116 can connect each of the arms 112 to the first canister bracket 100.

The second housing bracket 108 can be connected to the housing 104 in any appropriate manner such as but not limited mechanical fasteners, welds, adhesives, etc. For example, the housing 104 can include a pair of flanges 118, 120 and the second housing bracket 108 can include a pair of arms 122, 124. The first arm 122 can be connected to the first flange 118 and the second arm 120 can be connected to the second flange 120 by threaded fasteners 126.

The second housing bracket 108 can be connected to the second canister bracket 102 in any appropriate manner such as but not limited mechanical fasteners, welds, adhesives, etc. The second housing bracket 108 can include a body 128 and the second canister bracket 102 can include a flange 130. A threaded fastener, which is obstructed from view in FIGS. 4 and 5 by the cross member 92, can connect the body 128 to the flange 130.

The first housing bracket 106 can be located at an elevation that is below the elevation of the central portion 96 of the first rear seat support 84 with respect to the vertical direction V of the vehicle 10. The second housing bracket 108 can extend above and below the central portion 96 of the first rear seat support 84 with respect to the vertical direction V of the vehicle 10.

The first bracket 106 can include a body 132. The arms 112, 114 and the blades 110 can be connected to opposite sides of the body 132. The body 132 can include a window 134.

The body 128 and the arms 122, 124 of the second housing bracket 108 can be coplanar. The arms 122, 124 can extend away from the body 128. The second arm 124 can be connected to and extend from a portion of the second bracket 108 that is between the first arm 122 and the body 128.

Each of the brackets 100, 102, 106, 108 can be made from sheet steel that is stamped and bent into the desired shape. However, the brackets 100, 102, 106, 108 can be made from any appropriate material and by an appropriate process.

Referring to FIG. 4, the fuel tank 40 can be mounted to the right longitudinal member 70R of the rollover protection structure 32 in any appropriate manner such as but not limited to brackets and threaded fasteners. The fuel tank 40 can be mounted to any appropriate portion of the main frame assembly 34 and in any appropriate manner. For example, the main frame assembly 34 can include an intermediate member 136 that is connected to and extends from each of the fourth cross member 78 and the fifth cross member 80 along the transverse direction T of the vehicle 10. The fuel tank 40 can be connected to the intermediate member in any appropriate manner such as but not limited to a bracket and a mechanical fastener.

The fuel storage system 12 can include a purge valve, a vent valve and a controller that are omitted from the drawings for clarity and simplicity of the drawings. The vent valve can be any appropriate valve such as but not limited to a solenoid valve that is normally open to the ambient atmosphere and is configured to allow fuel vapor in the canister 42 to vent to the ambient atmosphere in the event that the fuel vapor in the canister 42 exceeds the storage capacity of the carbon material in the canister 42. The purge valve can be any appropriate valve such as but not limited to a solenoid valve that is normally closed and is configured to allow fuel vapor in the canister 42 to exit the canister 42 via the vapor supply line 46 when opened by the controller. The controller can be configured to electronically control each of the purge valve and the vent valve such that the controller can signal the valves to selectively move to a desired one of the opened position and the closed position.

While certain embodiments of the invention are described above, it should be understood that the invention can be embodied and configured in many different ways without departing from the spirit and scope of the invention.

For example, embodiments are disclosed above in the context of a canister 42 suspended from the first rear seat support 84. However, embodiments can include a canister connected to any portion of the frame assembly 14 that is below either of the rear seats 28L, 28R. For example, an alternate embodiment can include the canister 42 mounted to the second rear seat support 86 in any appropriate manner. In another alternate embodiment, the canister 42 can be located between the first rear seat support 84 and the second rear seat support 86 such that the canister 42 is spaced away from each of the seat supports 84, 86 in the longitudinal direction L of the vehicle 10.

Although the canister 42 is connected to the first rear seat support 84 by a plurality of brackets, any appropriate number of brackets can be used to connect the canister 42 to the first rear seat support 84 in order to meet the desired performance, cost and manufacturing parameters set for the vehicle 10. For example, the canister 42 can be mounted to the first rear support member 84 by a single bracket. Further, alternate embodiments can include the canister 42 connected to the first rear seat support 84 in any appropriate manner.

Although the first rear seat support 84 is connected to and extends from the longitudinal members 70L, 70R of the rollover protection structure 32, the rear seat support 84 can be connected to any appropriate portion(s) of the main frame assembly 34. Further, exemplary embodiments can include a rear seat support for each of the rear seats 28L, 28R such that the rear seat supports are separate and distinct structures.

What is claimed is:

1. A vehicle having a longitudinal direction, a traverse direction and a vertical direction that are orthogonal to each other, the vehicle comprising:
a floor;
a pair of front seats;
a pair of rear seats mounted behind the first pair of seats in the longitudinal direction, each of the rear seats is spaced above the floor in a vertical direction of the vehicle;
a fuel tank mounted under a first of the rear seats; and
a canister mounted under a second of the rear seats and is spaced above the floor in a vertical direction of the vehicle.

2. The vehicle according to claim 1, further comprising a conduit connected to and in fluid communication with each of the fuel tank and the canister.

3. The vehicle according to claim 2, further comprising an internal combustion engine, and each of the fuel tank and the canister are connected to and in fluid communication with the internal combustion engine, and the canister is a carbon canister.

4. The vehicle according to claim 1, further comprising a frame assembly including,
a pair of first longitudinal frame members extending along the longitudinal direction, the longitudinal frame members are spaced apart from each other in the transverse direction, and
a seat support connected to and extending from the first longitudinal frame members along the transverse direction, wherein
the canister and the rear seats are mounted to the seat support member.

5. The vehicle according to claim 4, wherein the seat support is a hollow tubular member.

6. The vehicle according to claim 4, wherein the seat support includes,
a first end portion that is connected to and extends from a first one of the first longitudinal members,
a second end portion is connected to and extends from a second one of the first longitudinal members,
a central portion,
a first bend that is connected to and extends from the first end portion to the central portion, and
a second bend that is connected to and extends from the second end portion to the central portion.

7. The vehicle according to claim 6, wherein the rear seats and the canister are mounted to the central portion.

8. The vehicle according to claim 1, further comprising a seat support extending along a transverse direction of the vehicle, wherein
each of the rear seats is mounted to the seat support, and the canister is suspended from the seat support.

9. The vehicle according to claim 8, wherein the seat support includes,
a pair of seat brackets, the second of the rear seats is mounted to the seat brackets, and
a first canister bracket adjacent to one of the seat brackets, and the canister is mounted to the first canister bracket.

10. The vehicle according to claim 9, wherein the seat support further includes,
a tubular member, the seat brackets and the first canister bracket are mounted on the tubular member, and
a second canister bracket mounted on the tubular member, and the canister is mounted to the second canister bracket.

11. The vehicle according to claim 10, wherein the canister includes,
a housing, and
a housing bracket mounted to the tubular member and supporting the housing.

12. A fuel storage system for a vehicle including a front row of seats and a rear row of seats located behind the front row of seats, the fuel storage system comprising:
a tube configured to support the rear row of seats on the tube;
a carbon canister suspended from the tube, located under a first seat of the rear row of seats, and spaced away from a second seat of the rear row of seats in a transverse direction of the vehicle;

a fuel tank adjacent to each of the tube and the carbon canister and located under the second seat of the rear row of seats; and a vapor conduit extending from and in fluid communication with each of the fuel tank and the carbon canister.

13. The fuel storage system according to claim 12, further comprising a pair of seat brackets mounted to the tube, the seat brackets are configured to mount the first seat of the rear row of seats to the tube.

14. The fuel storage system according to claim 13, further comprising a first canister bracket mounted to the tube at a location that is adjacent to one of the seat brackets, and the carbon canister is mounted to the first canister bracket.

15. The fuel storage system according to claim 14, further comprising a second canister bracket mounted to the tube, and the carbon canister is mounted to the second canister bracket.

16. The fuel storage system according to claim 15 wherein the carbon canister includes,
a housing,
a first housing bracket connected to the housing and mounted to the first canister bracket, and
a second housing bracket connected to the housing and mounted to the second canister bracket.

17. The fuel storage system according to claim 12, further comprising:
a pair of first seat brackets mounted to the tube and configured to mount the first the seat of the rear row of seats to the tube;
a pair of second seat brackets mounted to the tube and configured to mount the second seat of the rear row of seats to the tube; and a canister bracket mounted to the tube at a location that is between one of the first brackets and one of the second brackets.

18. A fuel storage system for a vehicle including a frame assembly, a seat support mounted to frame assembly, a pair of front seats mounted to the frame assembly in front of the seat support, and a pair of rear seats mounted to the seat support and located behind the pair of front seats, the fuel storage system including:
a fuel tank mounted to the frame assembly underneath a first one of the rear seats, the fuel tank is located in a space that is bounded by the first one of the rear seats and the frame assembly; and
a canister mounted to the seat support at a location underneath a second one of the rear seats, located in a space that is bounded by the second one of the rear seats and the frame assembly, and in fluid communication with the fuel tank.

19. The fuel storage system according to claim 18, further comprising:
a canister bracket connected to the seat support at a location in a transverse direction of the vehicle that is between a first seat bracket of the first one of the rear seats and a second seat bracket of the second one of the rear seats.

20. The fuel storage system according to claim 18, wherein the canister includes,
a housing,
a first housing bracket connected to each of the housing and the seat support, and
a second housing bracket connected to each of the housing and the seat support.

* * * * *